(12) United States Patent
Pickering

(10) Patent No.: US 7,445,070 B1
(45) Date of Patent: Nov. 4, 2008

(54) THREE WHEEL MOTORCYCLE

(76) Inventor: Gregory L. Pickering, 26162 Via De Toledo, San Juan Capistrano, CA (US) 92675

(*) Notice: Subject to any disclaimer, the term of this patent is extended or adjusted under 35 U.S.C. 154(b) by 120 days.

(21) Appl. No.: 11/417,481

(22) Filed: May 4, 2006

Related U.S. Application Data

(60) Provisional application No. 60/678,011, filed on May 4, 2005.

(51) Int. Cl.
*B62D 61/08* (2006.01)

(52) U.S. Cl. .................. 180/211; 180/215; 180/312

(58) Field of Classification Search ............... 180/210, 180/211, 215, 311, 312; 280/226.1
See application file for complete search history.

(56) References Cited

U.S. PATENT DOCUMENTS

| | | | | |
|---|---|---|---|---|
| 1,428,907 | A * | 9/1922 | Reigh | 180/16 |
| 1,727,522 | A * | 9/1929 | Schlie | 362/498 |
| 1,802,050 | A * | 4/1931 | Duresen | 180/226 |
| 1,877,609 | A * | 9/1932 | Stern et al. | 180/210 |
| 2,708,594 | A * | 5/1955 | MacPherson | 296/97.22 |
| 2,751,992 | A * | 6/1956 | Nallinger | 180/56 |
| 2,846,261 | A * | 8/1958 | Nickles | 362/496 |
| 2,878,032 | A * | 3/1959 | Hawke | 280/282 |
| 3,419,098 | A * | 12/1968 | Mayers et al. | 180/11 |
| 4,010,812 | A * | 3/1977 | Bothwell | 180/227 |
| 4,064,957 | A * | 12/1977 | Parham | 180/215 |
| 4,390,201 | A * | 6/1983 | Saunders | 296/97.22 |
| 5,327,989 | A * | 7/1994 | Furuhashi et al. | 180/248 |
| 6,164,675 | A | 12/2000 | Pickering | |
| 6,397,964 | B1 * | 6/2002 | Yamauchi | 180/229 |
| 6,637,763 | B2 * | 10/2003 | Kuo | 280/209 |
| 6,648,093 | B2 * | 11/2003 | Rioux et al. | 180/291 |
| 6,942,053 | B2 * | 9/2005 | Hinton | 180/209 |
| 6,994,365 | B2 * | 2/2006 | Kofuji | 280/277 |
| 2003/0102657 | A1 * | 6/2003 | Kuo | 280/755 |
| 2004/0094350 | A1 * | 5/2004 | Bogatay et al. | 180/311 |
| 2004/0140140 | A1 * | 7/2004 | Guay et al. | 180/210 |
| 2005/0035583 | A1 * | 2/2005 | Hinton | 280/755 |
| 2005/0077098 | A1 * | 4/2005 | Takayanagi et al. | 180/215 |
| 2005/0109554 | A1 * | 5/2005 | Ishikawa et al. | 180/312 |
| 2005/0217909 | A1 * | 10/2005 | Guay et al. | 180/68.4 |
| 2005/0247505 | A1 * | 11/2005 | Nagle | 180/312 |
| 2005/0257990 | A1 * | 11/2005 | Shimizu | 180/444 |
| 2006/0070790 | A1 * | 4/2006 | Kejha | 180/311 |
| 2007/0114814 | A1 * | 5/2007 | Ichikawa | 296/193.09 |
| 2007/0237656 | A1 * | 10/2007 | Pipkorn et al. | 417/366 |
| 2007/0238008 | A1 * | 10/2007 | Hogan et al. | 429/44 |
| 2007/0257516 | A1 * | 11/2007 | Davis et al. | 296/190.09 |
| 2008/0023173 | A1 * | 1/2008 | Savage | 165/41 |
| 2008/0035356 | A1 * | 2/2008 | Dahl et al. | 172/439 |

* cited by examiner

*Primary Examiner*—Kevin Hurley
*Assistant Examiner*—Karen J. Amores
(74) *Attorney, Agent, or Firm*—Stout, Uxa, Buyan & Mullins, LLP; Donald E. Stout

(57) ABSTRACT

A three wheel motorcycle with one leading front wheel and two driven rear wheels is capable of supporting increased dynamic loads of a V-8 automotive engine and transmission in addition to carrying up to three people and cargo. The body of the trike is integrated with the frame to ease manufacturing costs and improve the experience of the riders. Increased, versatile storage space is provided compared to prior art trikes, and the exhaust system is largely hidden beneath the body of the trike for improved appearance and safety.

21 Claims, 6 Drawing Sheets

THREE WHEEL MOTORCYCLE

This application claims the benefit under 35 U.S.C. 119(e) of the filing date of Provisional U.S. Application Ser. No. 60/678,011, entitled Three Wheel Motorcycle, and filed on May 4, 2005, which application is expressly incorporated herein by reference.

FIELD OF THE INVENTION

This invention relates generally to the body and chassis for a three wheel motorcycle and, more particularly, to the unique functioning features of the body and chassis for a three wheel motorcycle.

BACKGROUND OF THE INVENTION

In recent years, the popularity of three wheeled motorcycles or motorcycle trikes has greatly increased, resulting in the development of conversion kits that transform a conventional motorcycle into a trike. These kits allow users to enjoy the many benefits of conventional motorcycles without requiring the same level of riding skill or physical ability. A popular motorcycle trike consists of a frame similar to that of a motorcycle coupled to a motorcycle front suspension and single leading wheel in the front, and a pair of wheels in the rear mounted in a parallel, spaced apart fashion. The frame is attached to the front suspension at the neck. From the neck, numerous frame members attach to it and continue rearwardly over, around and under the engine and transmission, enclosing them in a cage-like fashion. This design requires the rider and passengers to sit in an elevated position over the engine and around the frame in the same seating position as a traditional motorcycle.

Conversion of a conventional motorcycle to a trike generally requires the purchase of a kit that replaces the rear section of the frame and suspension with two driving wheels mounted in a traditional swing-arm fashion. This, however, only allows the wheelbase to be lengthened marginally, if at all. The short wheel base, in turn, restricts the width allowed between the rear wheels, thus producing a very short and narrow trike that can be unstable at anything over moderate speeds. By producing a frame specifically designed for trikes, with a longer and wider wheelbase that accepts live or independent rear axles, these problems can be resolved.

The addition of a second rear wheel, increased vehicle weight, cargo, passenger and towing capabilities reduces the driving horsepower dramatically. To correct the problem automotive engines are often used, producing substantially higher outputs of horsepower and torque. This causes stress loads not seen on a conventional motorcycle conversion, thus threatening the structural integrity of the frame and the safety of the riders.

Increasing the overall weight, combined with the high seat height for the riders and passenger, creates a high center of gravity. This causes a negative effect on cornering and handling ability thus compromising safety of the riders. By lowering the power-train and seat height into the frame, better handling characteristics can be achieved. There is a need for a trike frame designed to support the increased weight and torque loads, thus allowing the engine and riders to sit in a lower position and producing a lower center of gravity. The frame should also be designed with a longer, wider wheelbase for increased stability in cornering and at higher speeds, thus improving the handling and safety of the riders.

Trikes powered with automobile engines sometimes require radiators. The most common design is the use of a single radiator mounted in the front or rear of the vehicle. Both can have major drawbacks. Mounting the radiator in front produces large amounts of heat transferred back on the engine and riders. Mounting the radiators in the rear causes insufficient air flow through the radiators, thus causing cooling problems. By mounting a pair of radiators in the middle of the body on either side of the driveline, cool air can be forced into openings in the body passing through the radiators, exiting out of the bottom, and continuing to the rear of the trike, thus eliminating the problem of overheating the engine or riders.

A common exhaust system approach for front engine trikes is to route the system along the outside of the trike body in an exposed manner. The problem with an exposed exhaust system is that the hot exhaust pipes can cause serious injury to riders mounting and dismounting the trike, and can also accidentally cause injury to passing or curious pedestrians who happen to contact the exhaust pipes while the trike is unattended.

Another common problem with trikes of the type disclosed herein is a very limited cargo capacity. Most trikes have cargo capacity which is the same as or perhaps marginally greater than that available on a conventional motorcycle. This lack of cargo space limits the utility of the trike to function as a true multi-passenger vehicle, particularly for longer road trips.

Motorcycle trikes of the type disclosed, using an automobile engine mounted in the front of the vehicle require an extended steering system to reach the rider positioned behind the engine. One prior art practice is to use extended handlebars or steering rods from the front suspension, which extend rearwardly over the engine to the rider behind the engine. This approach, however, can pose problems if a hood is incorporated into the body design.

A motorcycle trike body can be produced by either adding a body to a portion of an existing motorcycle using a conversion kit, or designed in its entirety for a specific application. A common type of trike consists of a frame with multiple brackets for various components attached to it, covered by a body. Most prior art trike bodies are made of fiberglass from molds for ease of reproduction. Significant advantages could be obtained by incorporating the components of the trike into the design of the fiberglass body, since this approach would significantly reduce fabricating costs and thus substantially lower the cost of production.

SUMMARY

The present invention provides a three wheel motorcycle chassis and body designed for use with an automotive type power-train. The frame is designed to attach to a motorcycle type front suspension and single leading front wheel.

The frame is capable of supporting increased dynamic weight loads of automotive engines, transmissions and rear ends. In addition, the lateral distance between the frame rails is wider toward the rear of the trike as compared to conventional trike frame, allowing for wider rear axles and suspension components to be mounted at a significantly wider stance. This feature reduces body roll greatly, thus improving the stability and handling ability of the trike.

The frame rails each have a low central portion designed to allow heavier engines and transmissions, as well as to allow the riders to sit low in the frame. This creates a low center of gravity, thereby dramatically reducing body roll associated with high profile trikes. The result is significantly improved handling characteristics, making the vehicle of the present invention more stable.

The frame in the present invention includes a pair of frame rails extending from the front to the rear of the vehicle, each constructed from one piece of mandrel-bent rectangular tubing. Each frame rail is bent on three separate points along the rail in a single flat plane. The frame includes additional strengthening constructed of tubing or channels that runs along the top side of each frame rail in high stress areas. The single frame rail design streamlines the construction of the frame, thus lowering the costs of manufacturing.

The frame also includes various cross-members along with a pair of motor mounts attached to the frame-rails, which are strategically located to perform multiple tasks, thus again reducing the number of components. Universal frame brackets for the rear suspension control arms allow various factory original independent or live axles to be attached to a standardized frame.

In another aspect of the invention, the body is of a unique design conforming to the frame and power-train. The driver and riders sit in a tandem fashion behind the engine. The front and rear seat are both multi functional in nature. The dashboard allows for stereo speakers, a shifting assembly, gauges, and a cup holder. The cooling system is routed from the engine along the inner frame rails to a pair of radiators mounted under the passenger seat. The radiator shroud holds the radiators in place and is sealed to the bottom side of the body, directing air entering from the side vents through the radiators so that it exits from the bottom of the vehicle.

The radiator shroud includes a forward portion designed to complete a front seat storage compartment. The body also allows for a trunk insert, thus providing multiple storage compartments.

In another aspect of the invention the steering mechanism is designed to be of a low profile nature. The steering arms attach to the bottom side of the front triple tree and continue back under the hood to a concealed rear steering assembly. The rear steering assembly's unique design attaches between the engine and transmission. By incorporating an internal steering system, enclosed within the trike body, the problem of accessing the engine compartment, noted above in the Background of the Invention portion of the specification, is solved by the present invention. This is because the hood can now be simply raised, instead of the formerly lengthy task, in prior art vehicles, of removing the hood from beneath the steering system for accessing the engine.

In another aspect of the invention the exhaust system is routed in a unique fashion, designed to be straddled by the rider's legs. The exhaust passages turn downwardly and back from the engine on the inside of the frame to a converter located at the front of the transmission. The exhaust passages then cross over the top of the frame and under the rider's leg, turning downwardly and back to a side pipe. By routing the exhaust pipes under the trike body, and using heat shields on all remaining exposed portions of the exhaust system, the risk of injury caused by the hot exhaust system is dramatically reduced, relative to known prior art systems.

The rear seating design on the inventive trike transforms the seat into a back support for the driver, while also providing additional storage capacity to the existing storage for transporting larger items. By thus designing a trike body with a relatively large and versatile storage capacity, and designing a rear seating area that converts into additional storage space, the utility and practicality of the inventive trike is greatly increased over known trikes.

In one aspect of the invention, there is provided a three-wheeled vehicle which comprises a chassis having a pair of frame rails extending along a length of the vehicle and a plurality of frame cross-members attaching the pair of frame rails to one another, as well as a body supported by the chassis. The vehicle further comprises a motorcycle front suspension and an automotive rear suspension. An exhaust system has a plurality of exhaust pipes which are substantially disposed beneath the body. For structural purposes, the frame rails are each formed of a single piece of structural material, preferably steel, and more preferably rectangular steel tubing having dimensions larger than 1½ inches×3 inches. A fuel tank is disposed beneath a frame cross-member and above a rear axle, and a fuel filler neck is disposed beneath a hinged license plate frame on a rear surface of the vehicle. A pair of steering rods connect a rear steering bracket assembly to portions of the front suspension, wherein the steering rods are disposed beneath an engine hood in a concealed fashion.

The hood is hinged between an open upward position and a closed downward position. The body includes a front seat and a rear seat, wherein the rear seat having a bottom and a back, and both the rear seat bottom and the rear seat back are hinged and thus pivotable in order to create, modify, or access storage space. Moreover, side panels on each side of the rear seat may be opened to access additional storage space disposed beneath the panels. A trunk is disposed behind the rear seat.

In another aspect of the invention, there is provided a three-wheeled vehicle which comprises a chassis having a pair of frame rails extending along a length of the vehicle and a plurality of frame cross-members attaching the pair of frame rails to one another. A body is supported by the chassis. The vehicle further comprises a motorcycle front suspension and an automotive rear suspension. A pair of steering rods connects a rear steering bracket assembly to portions of the front suspension, wherein the steering rods are disposed beneath an engine hood in a concealed fashion. A triple tree is mounted to the front suspension and includes front steering mounts for attaching the steering rods thereto. The front steering mounts are disposed on a bottom side of the triple tree between a center pivotal bore and outer leg bores disposed on each side.

In yet another aspect of the invention, there is provided a three-wheeled vehicle which comprises a chassis having a plurality of frame rails extending along a length of the vehicle and a plurality of frame cross-members attaching the plurality of frame rails to one another. A body is supported by the chassis. The vehicle further comprises a motorcycle front suspension, an automotive rear suspension, a front seat, and a rear seat, wherein the rear seat is adapted to accommodate two passengers and is hinged so that it may be positioned between a first orientation wherein one or more passengers may be accommodated thereon and a second orientation wherein additional cargo space is provided. The rear seat preferably comprises a seat bottom and a seat back, wherein both the seat bottom and the seat back are hinged and thus pivotable in order to create, modify, or access storage space. A trunk is disposed behind the rear seat, and side panels are preferably provided on each side of the rear seat, which may be opened to access additional storage space disposed beneath the panels.

The invention, together with additional features and advantages thereof, may be best understood by reference to the following description taken in conjunction with the accompanying illustrative drawings. In these accompanying drawings, like reference numerals designate like parts throughout the figures.

DESCRIPTION OF THE PREFERRED EMBODIMENTS

Figure 1:
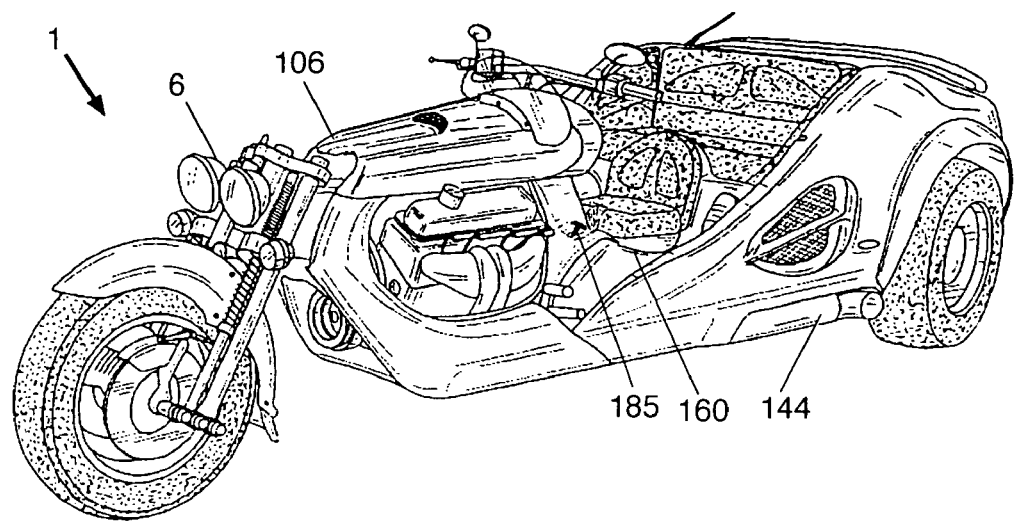
FIG. 1 is a perspective view of an embodiment of the vehicle of the present invention, constructed in accordance with the principles of the current invention for a three wheeled vehicle.

Referring now to FIG. 1, an embodiment of a three wheel vehicle or motorcycle 1 constructed according to the principles of the present invention is illustrated. In this description any three wheeled motorcycle having a single front wheel and supported by a leading front suspension 2 will be referred to as a "trike".

Figure 2:
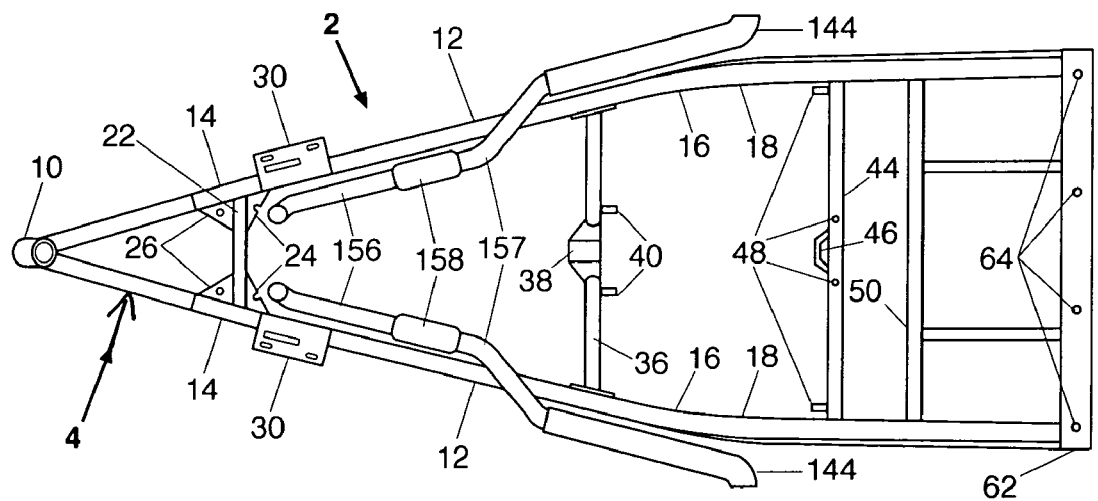
FIG. 2 is a top plan view of the frame of the vehicle of FIG. 1.
Figure 3:
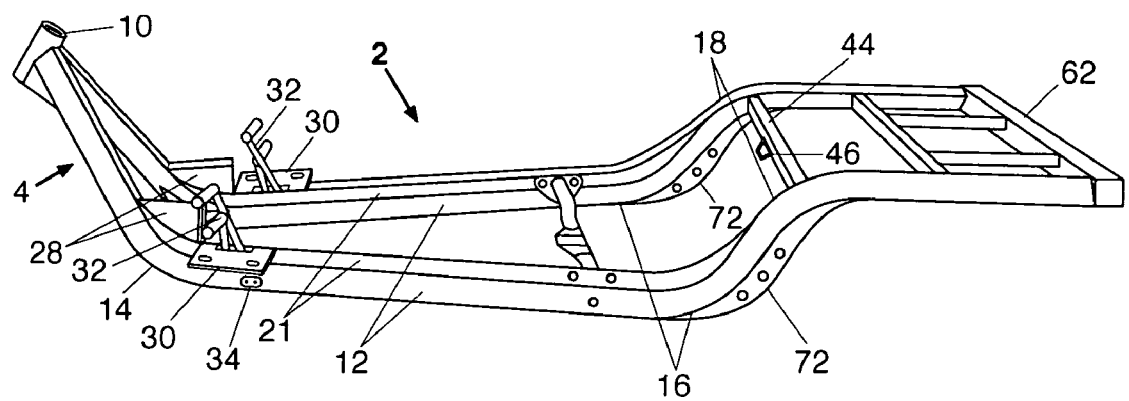
FIG. 3 is a side view of the frame of FIG. 2.
Figure 4:
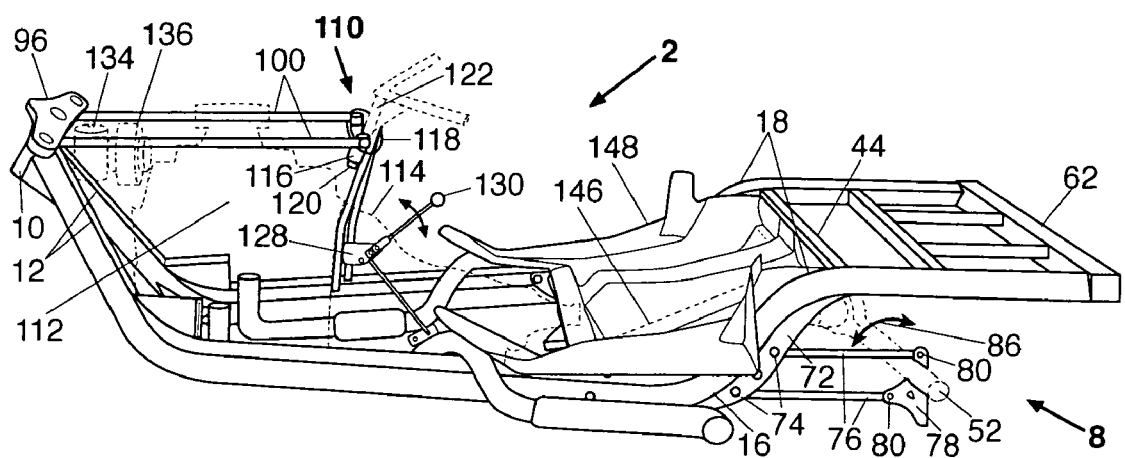
FIG. 4 is a side view of the assembled chassis of the vehicle of FIG. 1.

As shown particularly in FIGS. 2-4, a chassis 2 is comprised of a frame 4, a front suspension 6, a rear suspension 8, and all of the working components thereof. The frame 4 is attached at a front steering neck 10 to a front suspension. The frame 4 begins with the front steering neck 10 at the forward end. The neck is used to pivotally connect the chassis to the front suspension 6. The frame 4 includes a pair of frame rails 12, each preferably entirely constructed from one continuous piece of structural tubing.

Referring now particularly to FIG. 3, each frame rail 12 contains three mandrel bends 14, 16, 18 which are angled inwardly at reference numeral 20 (FIG. 5), at the top of each rail throughout their entire length. The frame rails 12 are preferably made from a length of rectangular steel tubing having a dimension preferably larger than 1½ inches by 3 inches extending from the front steering neck 10 to rear of the frame. The shape and dimensions of the frame tubing of the illustrated embodiment are exemplary, and may vary depending on the tubing type as well as many other factors. For example, some of these factors may include the vehicle model, capacity for passengers and cargo, and towing requirements.

Referring to FIG. 2, the frame rails 12 attach to the front steering neck 10 and continue to diverge laterally to the second mandrel bend 16, then converge again as they incline to the third mandrel bend 18. The third mandrel bend on each frame rail is a compound bend, turning downwardly and inwardly and continuing on in a horizontal fashion to the rear of the frame parallel to the respective frame rail.

For purposes of this disclosure, "lower", such as lower frame, shall refer to the location or direction nearest the ground, while "upper" shall relate to the location or direction generally skyward and thus, away from the ground. In a similar fashion, "forward" shall refer to the location or direction nearest the forward most point on the vehicle.

Referring again to FIG. 3, the frame includes a frame brace 21 for additional strengthening and support of the frame. The frame brace 21 runs the length of each frame rail over the lower horizontal portion of each frame rail 12, over and between the first and second mandrel bends 14, 16. The frame brace 21 may follow the contour of each bend and taper down to terminate at a point past each end of the first and second mandrel bends 14, 16. The brace may be constructed from mandrel bent tubing or channeled metal, and welded to the frame rail. The frame brace may also be run above the lower frame rail parallel to it in a spaced apart ladder type fashion.

The frame further includes a front cross-member 22 welded between the lower front frame rails 12, connecting them together near the center of the first mandrel bend 14 for lateral support of the frame. The front cross-member 22 includes dual purpose horizontal and vertical gussets 24 and 26, respectively, to help strengthen the frame. The lower cross-member gussets 24 are positioned in such a way to be additionally used as a fastening point for towing and include a hole and or a notch engineered to accept a tow bolt or hook. The upper front cross-member gussets 26 are positioned that they provide additional utility as a mating surface for the lower front cowling.

Referring particularly to FIG. 3, the frame incorporates two, dual purpose motor mount gussets 28. The gussets 28 are centrally located over the first mandrel bend 14 of each frame rail 12. The gusset comprises an inverted channel-shaped piece of metal with a flat top surface for bolting an engine to the frame. The rear portion of the gusset provides an opening for internal access to hardware connecting the engine through a motor mount to the gusset. The front portion of the engine conforms to the inside radius of the first mandrel bend 14, serving as a gusset for strengthening the frame in a high stress area.

Continuing with reference to FIGS. 2 and 3, the frame further includes a pair of foot peg perches 30 that are each mounted to the outside of each respective frame rail 12 adjacent to the first mandrel bend 14. The perch 30 is fastened horizontally, thus serving a dual purpose by providing a top surface area for mounting a trike body 31. The bottom surface of the perch 30 provides a mounting surface for a foot peg/brake pedal assembly 32, and a master cylinder assembly 34. The perch design provides mounting both for the foot peg/brake pedal 32 and the master cylinder 34 in a concealed fashion to the bottom side of the perch. The perch design also allows an emergency brake pedal to be mounted in a mirror image of the brake pedal on the opposing perch 30. Additionally, this unique perch design permits the foot peg/brake pedal and master cylinder assemblies to slide as one unit on either side, forwardly and rearwardly, thus providing adjustability for rider comfort. Moreover, the inventive perch design provides ease of accessibility on the outside of the frame from the underneath side of the body 31 for ease of maintenance and adjustment of the master cylinder and brake lever linkage. The design conceals the assemblies under the body 31 for a more desirable appearance.

Figure 10:
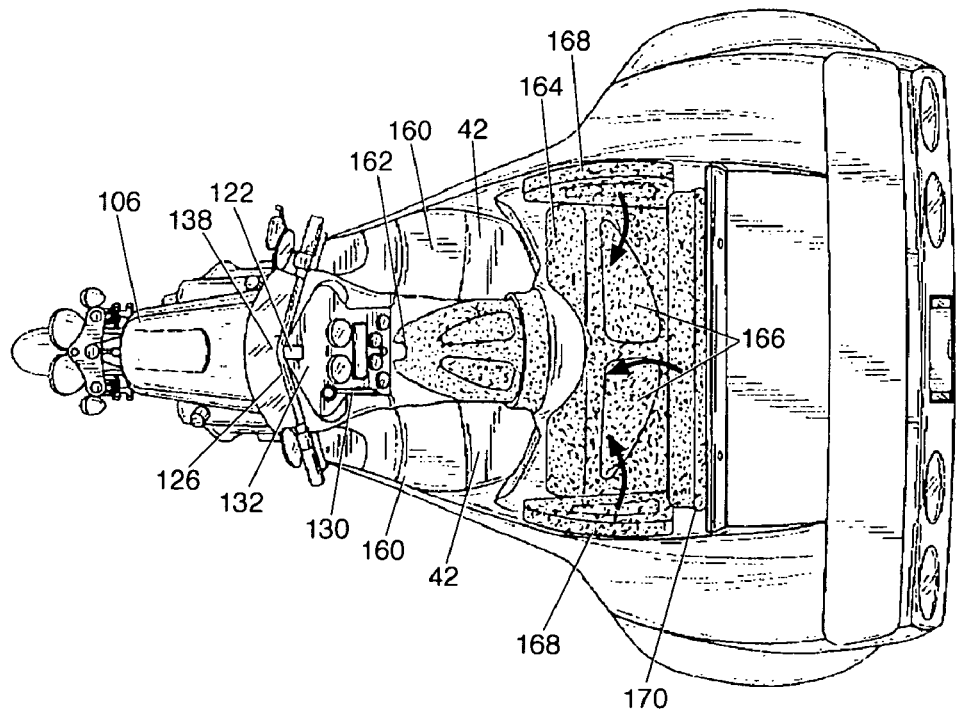
FIG. 10 is a top view of the vehicle of FIG. 1.

The frame 4 also includes a removable transmission cross-member 36 that spans across the frame-rails 12 mid-way between the first and second mandrel bends 14, 16. The transmission cross-member 36 connects the rails together for lateral structural support of the frame and is positioned to support and mount the rear of the transmission through a center transmission mount 38. The transmission cross-member also contains driver seat belt mounts 40 for attachment of a driver seat belt assembly. The transmission cross-member additionally supports the trike body 31 internally through a floorboard 42 (FIG. 10).

The frame includes a rear seat cross-member 44 spanning across and connecting the frame rails adjacent to the third mandrel bend 18. The cross-member attaches to the body 31 behind the rear seat, supporting the seat. The cross-member also provides a mounting bracket for a center rear axle torque mount 46 used to secure an independent rear suspension. The rear seat cross-member 44 is designed to prohibit axle rotation 86 (FIG. 4) generated in the center section of an independent rear suspension produced during acceleration and braking. In addition, the cross-member contains rear seat belt mounts 48 for passengers, located laterally along the member. The front and rear seat belt assemblies use a retractable mechanism located on the lower portion of the assemblies. The concealed mounting design permits the mechanisms and the lower portion of the seat belt assemblies to be mounted below the body 31. The top portion of the belt and buckle on the seat belt assemblies protrude up through the body 31, remaining the only visible portions of the assemblies to thus present a more desirable appearance.

Figure 5:
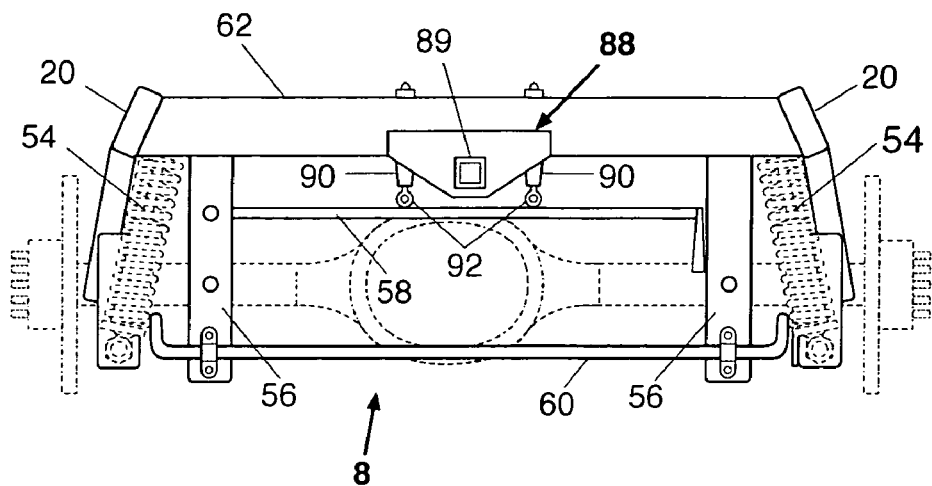
FIG. 5 is a rear view of the assembled chassis of the vehicle of FIG. 1.
Figure 6:
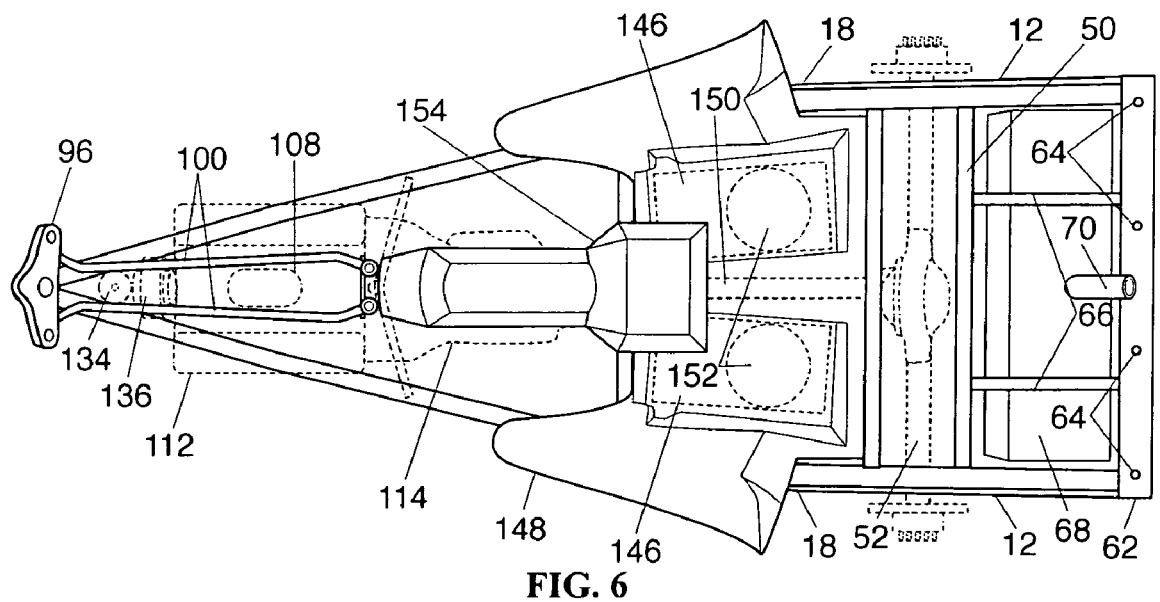
FIG. 6 is a top view of the assembled chassis of the vehicle of FIG. 1.

Referring now particularly to FIG. 6, an axle cross-member 50 spans across the frame rails midway between the third mandrel bend 18 and a rear end of the frame, thus providing lateral support to the frame. The axle cross-member 50 is positioned over and behind the rear axle 52, supporting the rear of the vehicle body 31 through the floor of the trunk, as discussed below. The axle cross-member 50 also serves as an upper mount for coil-over shock absorbers 54 (FIG. 5) and a pair of cross-member struts 56. The struts are positioned below the cross-member, running vertically downwardly, spaced apart in a parallel fashion. The unique strut positioning allows a pan-hard bar 58 and a sway bar 60 to attach in various locations along the vertical length of the struts for numerous live axle or independent rear suspension applications.

The frame 4 further includes a rear cross-member 62 that spans across the frame, connecting the ends of the frame rails 12 and supporting the frame laterally. The rear cross-member is designed to support the weight of the body 31 through the floor of a trunk. The rear member provides a flat mating surface containing vertical holes 64 along its length for attaching the body 31 to the frame through the rear portion of a floor 174 (FIG. 7), of a trunk enclosure 172 in a concealed manner. By providing an internal mounting system for the body 31, large diameter washers may be used to cover an increased surface area for much stronger attachment of the body 31 to the frame. The internal mounts through the trunk floor also eliminate unsightly visible mounts, exterior body 31 warpage, and fatigue cracks associated with external body mounts.

The frame includes internal frame members 66 spanning between the axle cross-member 50 and rear cross-members 62 help strengthen against the rearward bending forces incurred on the cross-member when used for towing purposes, and provide additional support to the floor of the trunk. The internal members are also positioned to provide mounting points for attaching the fuel tank to the frame. A fuel tank 68 is designed to attach to the bottom side of the internal frame members 66 between the axle and rear cross-members. The low mounting position of the tank below the frame permits a filler neck 70 to extend up and over the rear cross-member, concealed behind the rear portion of the body. The filler neck is accessible from an opening 71 (FIG. 12) in the body behind a pivotable license plate mounted to the rear side of the trike body 31. The design reduces both the material and labor costs associated with an externally exposed fuel tank and filler assembly, improving the overall appearance by concealing the filler neck behind the license plate.

Referring now to FIG. 4, the frame includes a pair of rear suspension control arm plates 72 attached between the second and third mandrel bends 16, 18 on each frame rail 12. The two plates are mounted parallel to one another vertically on the rearward facing side of each frame rail 12. The plates serve a dual purpose. They conform to the inside radius of the third mandrel bend 18 on each frame rail, thus strengthening the frame in a high stress area. Each plate also contains control arm plate bores 74 along its length, aligned horizontally with bores laterally mounted on the adjacent frame rail. The bores are staggered in a parallel fashion to the incline of the frame, and provide attachment of upper and lower control arms 76 between each set of plates. The staggered design provides a frame mount for original equipment control arms found, for example, on General Motors independent rear suspensions, as well as control arms for solid or "live" axle applications.

The chassis 2 includes a pair of axle brackets 78 mounted to the axle. Each axle bracket 78 is positioned behind each pair of control arm plates on the frame and attached to the chassis through the rearward end of each pair of control arms 78. Each axle bracket provides two sides for mounting the control arms between opposing sides and contains axle bracket bores 80 vertically staggered over each other at the same inclined angle as the bores on the control arm plates. The staggered design of the bores positioning the upper axle bracket bore 84 over the axle rather than in front of it like the lower axle bore, allowing the longer upper control arm to remain at an equal length with the lower control arm. This axle bracket design provides a longer vertical pivotal arc in the upper arm, resulting in less forward and rearward motion during vertical travel in axle, resulting in a smoother ride. The axle bracket design further allows the upper and lower control arms to remain equal in length, thus permitting the axle to travel up and down without the rotation during its vertical travel which is associated with unequal length upper and lower control arms on solid axle applications. Axle rotation 86 during vertical travel produces binding on all laterally mounted pivotal components mounted to the axle, such as the coil over shocks 54 (FIG. 5) and the pan-hard bar 58, producing a rough riding suspension. This binding can cause premature failure of the aforementioned mounts, resulting in potential injury to riders.

As shown in FIG. 5, the frame includes a bolt-on receiver hitch assembly 88 designed to bolt to the bottom of the rear cross-member 62. The receiver hitch is preferably three-sided, and conforms to the bottom and sides of the rear cross-member. It includes a receiver hitch housing 89 positioned horizontally, facing rearwardly with two vertically placed spacers 90, one on each side of the housing, respectively. The assembly is secured in place to the rear cross-member through the spacers with eye bolts 92 or hooks vertically bolted through the spacers 90. The spacers permit the eye bolts to extend downwardly, protruding through the trike body to provide safety chain mounting points for securing a trailer in tow. The receiver hitch assembly is designed to be concealed behind the trike body, so that only the eye bolts remain exposed.

Figure 8:
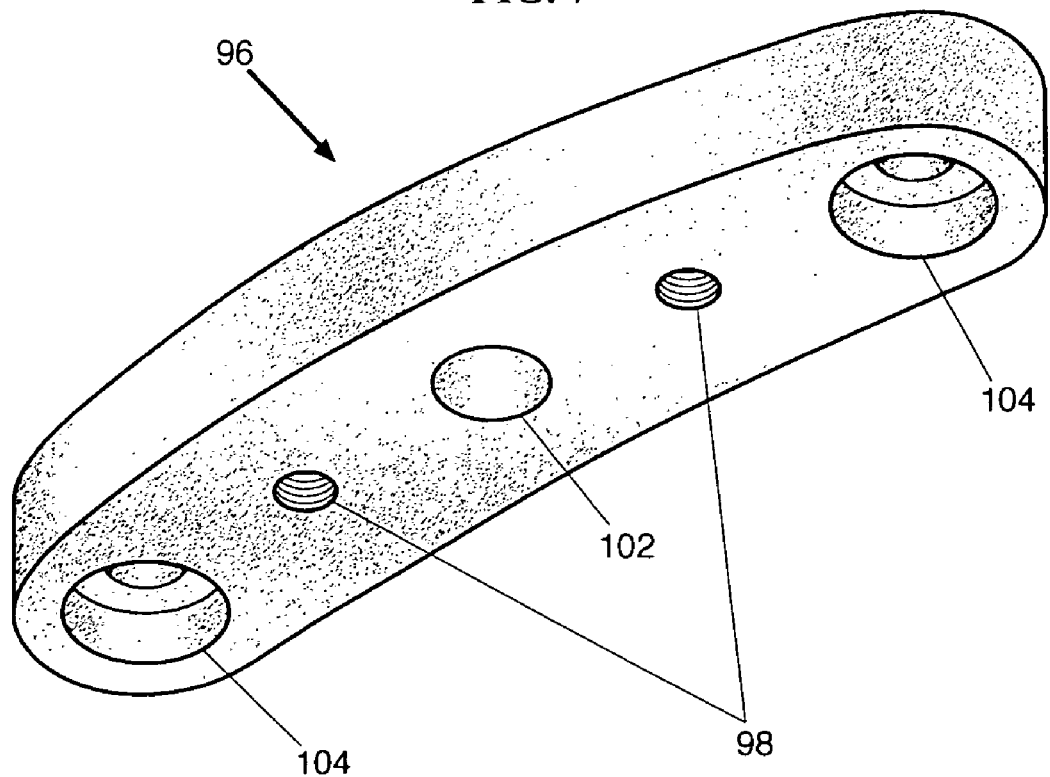
FIG. 8 is a bottom view of the upper triple tree of the vehicle of FIG. 1.

Referring now particularly to FIGS. 6 and 8, an upper triple tree 96 is mounted to the front suspension 6. The triple tree 96 includes threaded front steering mounts 98 for attaching steering rods 100 thereto. The steering rod mounts are located on the bottom side of the triple tree between a center pivotal bore 102 and outer leg bores 104 on each side. This unique design allows the attachment of the steering rods 100 to the bottom side of the upper triple tree 96 in a low profile manner so that the rods can extend rearwardly under a low profile hood 106 (FIG. 1). Thus, the steering rods are concealed beneath the hood, offering a more desirable appearance. The bottom attachment design of the steering rods further allows the hood 106 to pivot upwardly without obstruction from steering rods mounted on the top of the upper triple tree and over the top of the hood, as was known in the prior art.

The above noted steering rods 100 extend rearwardly in a parallel fashion, with the front of each steering rod angling inwardly laterally as it extends rearwardly. This inward angle prevents binding in each rod with the outer legs of the front suspension when turned to its fullest length of travel. The narrowing width between the rods requires a much narrower opening in the front of the hood 106 (FIG. 1) for the rods to protrude through, thus adding to the concealment of the rods. The narrow width also allows for a smaller, narrower hood in order to streamline the overall appearance of the trike. The rear end of each steering rod is designed to angle outwardly laterally toward the front, thus providing clearance for an engine air cleaner 108 when steering. Each steering rod is fastened with rod ends that allow the steering rods to rotate as they pivot on their respective mounting points. The inward to outward offset from front to rear on each steering rod end keeps the weight distribution of each rod evenly balanced throughout the pivoting travel when engaged in steering. This balanced design of the steering rods prevents them from pivoting or flopping to a low point when engaged in turning in order to prevent sudden misdirection in steering. By providing proper offset and balancing of the steering rods, improved steering, stability, and working clearance can be achieved in a low profile design concealed under the hood.

Referring now again to FIG. 4, the rear end of each of the steering rods 100 connects to a rear steering bracket assembly 110 that is in turn bolted in place between an engine 112 and a transmission 114. The bracket assembly includes a rear steering neck 116 and a steering plate 118 pivotally attached to the rear neck by a rear steering shaft 120. The rear steering assembly provides an attachment for the rear ends of the steering rods and a handlebar riser 122. The riser or risers extend up through or behind the hood, connecting to a handlebar 126 (FIG. 10), and may be incorporated into one piece. The handlebar operates the front suspension from a rearward location through the action of the rear steering assembly and steering rods. The low profile design of the rear steering assembly conceals the assembly and steering rods under a hood. The handlebar 126 and handlebar riser 122 extending up through the hood remain the only visible parts of the rear portion of the steering system, producing a more desirable appearance.

Referring still primarily to FIG. 4, a shifter assembly 128 is designed to be mounted inside a body enclosure behind the dashboard, thus protecting the shifter assembly's electronic components from the elements. The lower end of the shifter assembly connects through a linkage to the transmission 114. The upper end of the assembly contains a shifter shaft 130 operating in a vertical pivoting action for making the desired gear selection. The shifter shaft 130 protrudes through or alongside the left portion of a dash panel 132 (FIG. 10), and is the only visible part of the shifter assembly. The dash panel 132 provides a location for the gear selector index for making the proper gear selection. The concealed design of the shifter assembly protects the working components and produces a more appealing overall appearance.

The chassis 2 further contains an engine coolant overflow tank 134 (FIGS. 4, 6) attached to the frame directly behind the intersection of the front steering neck 10 and frame rails 12. The location of the coolant overflow tank is important in reducing engine overheating conditions caused by the introduction of air into the engine cooling system. By positioning the overflow tank at the highest point on the frame above the engine, coolant is drawn back into the system aided through natural gravitational forces during engine cool down periods. By positioning the overflow tank at the highest point on the frame above the engine, coolant is drawn back into the system, aided through natural gravitational forces during engine cool down periods. By positioning the overflow tank higher than the coolant level in the engine reduces the tendency of drawing unwanted air back into the system. Positioning the coolant tank away from the hot engine, and providing fresh air flow around the tank further aids in cooling, reducing overheating problems associated with the engine's cooling system. The tank's location on the frame also eases maintenance and provides an unobstructed visual inspection of the system's coolant level without opening the hood.

The chassis 2 also includes a centrally located alternator 136 (FIGS. 4, 6) mounted directly behind the overflow tank 134 in front of the engine 112. The unique location conceals the alternator under the narrow hood 106 (FIG. 10), thus protecting it from the elements. Alternators mounted externally outside a body have rotating parts that can result in personal injury. The unique low center-mounted design provides clearance for steering rods 100 to pivot directly over and around each side of the alternator in close proximity during their respective paths when the front suspension engages in turning. The unique compact design conceals the alternator under the narrow, low profile hood, protected from the elements and personal injury, providing a more aerodynamic frontal appearance to the trike.

Referring now in particular to FIG. 10, the hood 106 covers the top portion of the engine 112 and has a rear pivoting point located near the intersection of the handlebar riser and the top of the dash panel 132. The pivotal design located under the handlebar permits the hood to pivot unobstructed upwardly under the bars and over the steering rods in the front, and downwardly in the rear over the dash panel. The pivotal design permits the hood to open freely upwardly, thus providing unrestricted access to the top of the engine. The pivotal location adjacent to the intersection of the handlebar riser 122 and the top of the dash panel 132 also provides for a significantly smaller opening when raising the hood. The smaller opening provides additional protection of the engine's electrical and mechanical components from the elements and improves the overall appearance. By designing an internal steering system extending under the hood, the labor intensive prior art task of accessing the engine by unfastening the corners of the hood and removing the hood from beneath the steering rods without damaging any paint or components can now be avoided. The pivotal design permits a simple one-piece hood to operate unobstructed by handlebars or steering rods while remaining affixed to the body, thus simplifying access to the engine.

Figure 11:
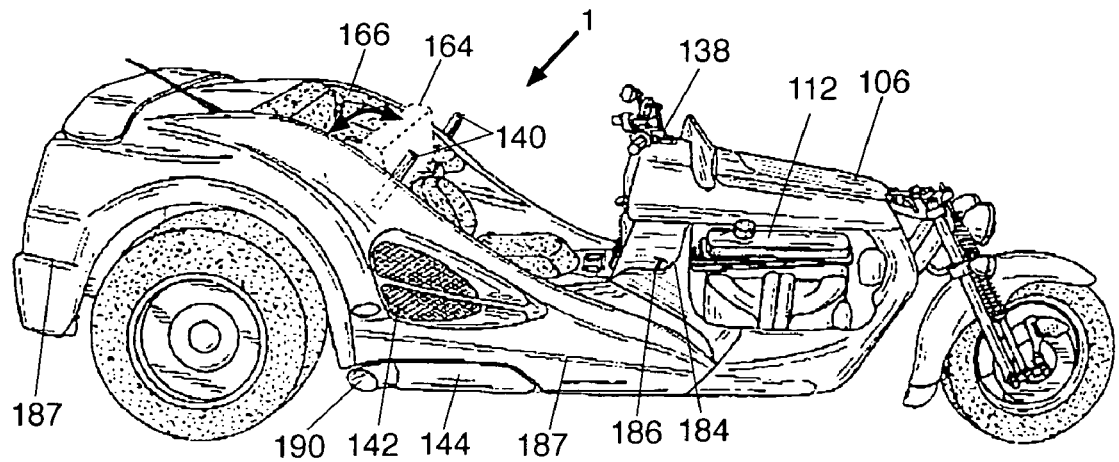
FIG. 11 is a side view of the vehicle of FIG. 1.

Continuing with reference to FIG. 11, the trike body also contains a pair of concealed handgrip assemblies 140 mounted to a body internally. The design allows the handgrips to extend upwardly in telescopic fashion out of the assembly, protruding out of the body into a locked position for use as passenger handholds. The grips can then be retracted into the body, allowing the assembly to remain concealed when not in use, thereby improving the overall appearance in the body.

The trike 1 includes a pair of fresh air intakes 142 positioned on each side of the body in front of the rear wheels. The location of the intakes is designed to direct air to flow into the sides of the body over side pipes 144 and under a rear seating area 166. The airflow continues through a pair of radiators 146 (FIG. 6) exiting rearwardly under the rear axle 52, continuing out under the rear of the trike. The body includes a radiator shroud 148 mated to the bottom of the trike body, securing a pair of radiators in place. The radiator shroud conforms to the bottom of the body, directing the air entering from the intakes through the radiators and out of the bottom of the trike for maximum cooling efficiency. The shroud's design allows air to enter from either or both sides on the body and flow through both radiators, thus preventing overheating problems associated with insufficient air flow when riding in a crosswind.

Figure 9:
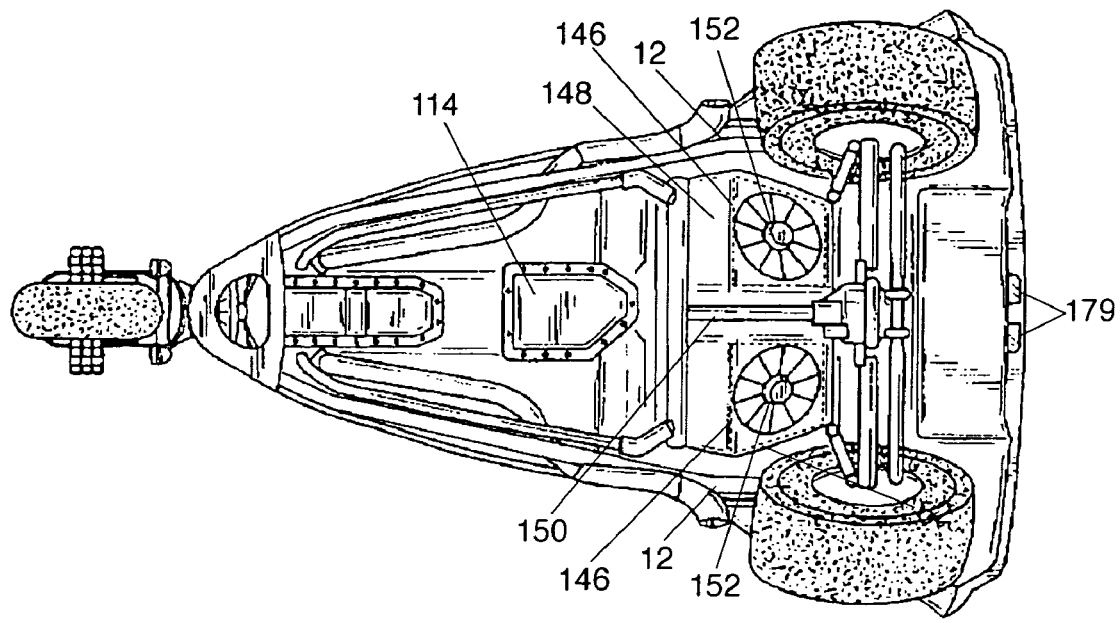
FIG. 9 is a bottom view of the vehicle of FIG. 1.

Referring still to FIGS. 6 and 9, the radiator shroud 148 positions two radiators 146, between the frame rails 12, behind the transmission 114, in front of the rear axle 52 separated in the middle by a driveshaft 150. The radiator shroud secures the radiators in a flat horizontal position with an incline from front to rear. This incline provides clearance on the bottom rear side of the radiator shroud for attaching electric cooling fans 152. The cooling fans draw air through the radiators from the rear of the shroud directing the airflow toward the rear of the trike.

The body includes an enclosure panel 154 that conforms to the bottom side of the body under the dash, front and rear seats. The enclosure may include dividers which create individual compartments under the dash, front, and rear seats. The enclosure is designed to protect all of the contents in the enclosure from the elements and is designed for mounting the vehicle's electrical system components as well as providing a storage area. The individual compartments of the enclosure are accessible from openings in the body under the front and rear seats.

Referring now once again to FIG. 2, the chassis 2 includes a dual exhaust system 156. The exhaust system includes left and right exhaust pipes 157, catalytic converters 158, and side pipes 144, all in a mirror image of each other. Each exhaust pipe originates from its respective lower side of the engine, extending downwardly to the bottom of the frame on the inside of each frame rail 12. Each exhaust pipe continues rearwardly in a parallel fashion with the frame to a catalytic converter 158. Each pipe then crosses over its respective frame rail 12 directly below a raised floorboard on each side of the body 160 (FIG. 1). Each exhaust pipe then turns downwardly and rearwardly, terminating into a respective side pipe 144. The exhaust system may also exclude a catalytic converter or incorporate the converter in the side pipe. The exhaust system may also use a muffler in place of a side pipe, depending upon regulatory requirements. The converter is located adjacent to and under the raised floorboard 160 on the trike body. The raised floorboard design allows added working clearance for the catalytic converter and dissipation of excessive heat produced by the converter. The exhaust system design routes the hot exhaust pipes under the body of the vehicle rather than on the outside in an exposed manner, and includes protective heat shields on all exposed areas of the system, such as headers and side pipes. The design reduces the chance of personal injury to the occupants and any pedestrians who may potentially come into contact with the hot exhaust system. The concealed design of the exhaust system improves the overall safety and appearance of the trike.

Referring now to FIG. 10, the trike body has a hinged front seat with a horseshoe-shaped profile 162 on the front exterior portion, designed to conform to a beverage container. The seat secures the container in place when in a horizontal operating position. The trike body also contains a rear seat bottom 164 designed to pivot upwardly about the hinge toward the driver from a lower frontal pivot point to a fixed incline position. Pivoting the rear seat into the inclined position provides full back support for the driver. The pivotal design also allows the inclined seat to transform the rear seating area 166 into additional storage. The trike body further includes padded side panels 168 on each of the rear seating area portions, which also are hinged so that they may be opened to allow access to storage areas behind each panel. The trike body further includes a rear seat back 170 designed to be hinged to an open position from a lower pivot point, providing a concealed access to the trunk storage area located behind the seat. The rear seat pivots downwardly into a nearly horizontal position flush with the surface area of the trunk floor, thereby doubling the vehicle's total storage capacity. The rear seat back 170 can be pivoted into a horizontal position by itself over the rear seat bottom or pivoted into a horizontal position in conjunction with the rear seat bottom 164 in an inclined position. The pivotal designs of the rear bottom and back used in conjunction with each other provide quick and easy additional storage for transporting much longer and larger items, thus improving the utility of the trike.

Referring now to FIG. 10, as noted above the trike body includes a dual-purpose raised floorboard 160 on each side of the body, located below the dash panel 132. The raised floorboard provides clearance on the underneath side for catalytic converters and/or exhaust pipes crossing over the lower frame rail as explained above. The top rear inclined portion of the raised floorboard is designed as a foothold used by passengers to aid in self restraint when riding and particularly when braking.

Figure 7:
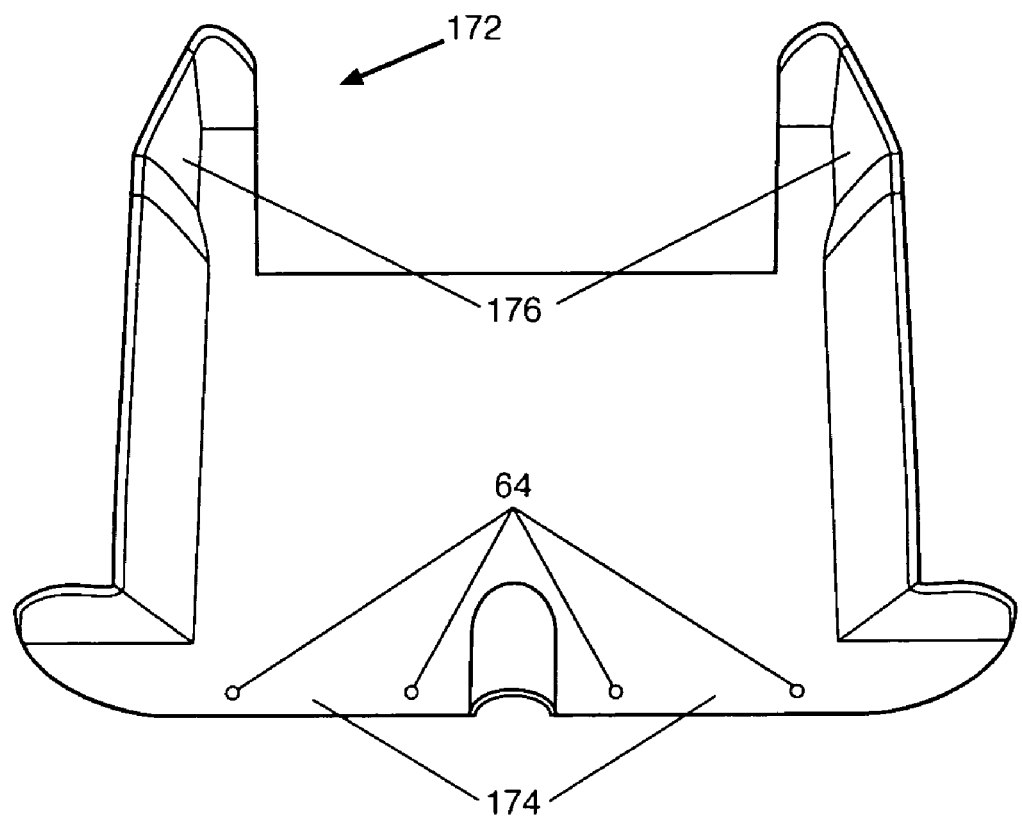
FIG. 7 is a top view of the trunk enclosure of the vehicle of FIG. 1.

Referring now to FIG. 7, the body contains a trunk enclosure 172 that bonds to the bottom side of the body for structural support. The trunk enclosure supports the entire rear and rear sides of the trike body and provides concealed mounting points for attaching the body to the frame. The rear profile of the trunk enclosure bonds internally to the back and rear sides of the body behind each rear wheel well, enclosing the taillights, backup lights, and rear side-clearance lights, protecting the electrical components from the elements. The rear portion of the trunk floor is designed to mate through the vertical holes 64 (FIGS. 6 and 7) to a rear cross-member, providing concealed mounting points for the rear portion of the body. The trunk enclosure further includes trunk side walls 176 that extend forwardly around the sides of the rear seating area 166 (FIG. 10), creating additional separate side storage compartments behind the padded side panels 168.

Figure 12:
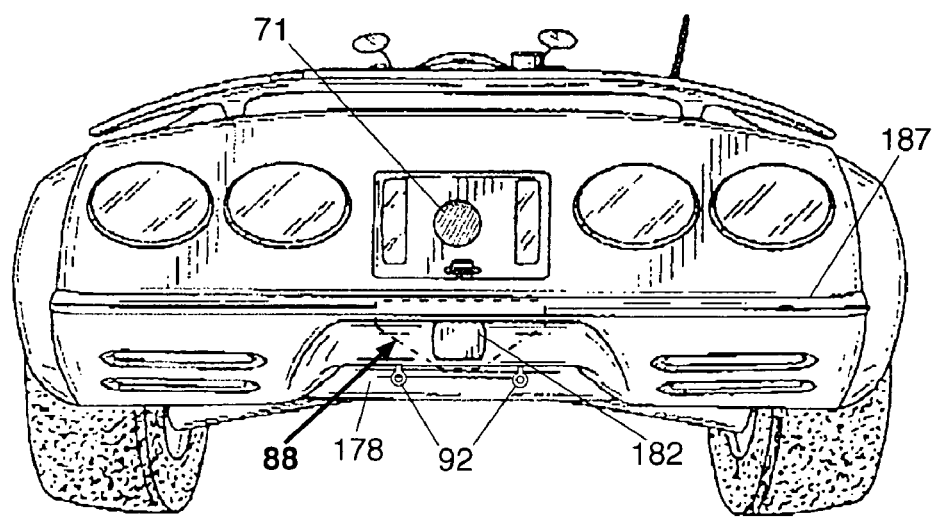
FIG. 12 is a rear view of the vehicle of FIG. 1.

Referring now to FIG. 12, the trike body includes a rear recessed area 178 under the receiver hitch assembly 88, designed to provide concealed access from the bottom to a receiver hitch pin and electrical plug used for trailer lights. The recessed horizontal portion under the hitch assembly provides concealed hitch access openings 179 (FIG. 9) to the assembly visible in the body only from a near ground level perspective. The rear recessed area 178 permits eye bolts 92 to protrude downwardly through the openings in order to provide attachment points for safety chains, as discussed above. The rear recessed area is designed to be wide and deep enough to provide working clearance for the safety chains to hang downwardly from the mounts away from the body, to thereby reduce possible damage to the body or paint from the chains when in use. The opening in the rear side of the body providing access to a receiver assembly can be concealed with a hitch cover 182 when not in use. The design of the rear recess area conforming under the receiver assembly conceals the unsightly working components and access to the receiver hitch assembly, improving the overall appearance of the body.

Referring now to FIG. 11, the trike body includes recessed areas on each side of the dash panel 184 in a mirrored image to each other. The recess design provides a right angle protrusion area in the body for an emergency brake release lever 185 (FIG. 1) located on the left side of the dash panel, and dipstick tube 186 located on the right side of the panel. The recess areas along the sides of the dash panel 184 are designed to provide a low profile mounting location for the lever and tube, sunken into the body. This recessed design permits the rider to use self restraint when cornering by hugging the body of the trike with his or her legs without obstruction from the lever or tube.

The trike further includes a protruding horizontal body line 187 (FIGS. 11 and 12) extending around the rear and sides of the body. The line significantly strengthens the lower portion of the body panels, reducing flex and warpage in the panels. The line is also designed as a guide in aligning the radiator shroud insert and trunk insert during installation. The body line is used to mate the outer horizontal edges of the radiator shroud and trunk enclosure to the body along the internal side of the line. The design of the horizontal body line further aids in reduction of external warpage to the body that can commonly occur along internal bonding points.

Referring in particular to FIG. 11, the trike body includes a pair of replica side pipes 144 positioned along the bottom of the body in front of the rear wheel wells, each on their respective sides. The design allows a portion of the body to resemble a functional side pipe. The design provides working clearance for a functional muffler to be concealed under the body behind the replica side pipe. The design further allows a functional exhaust system to terminate at an opening in the rear center portion of each side pipe 190, giving a functional appearance to the replica pipes. The replica shaped side pipe 144 design also allows for easy removal of the entire non-functional side pipe from the body and replacement with a pair of similar shaped functioning side pipes without major modifications to the body or paint. The design provides various exhaust style options without major modifications, for meeting the rider's personal preferences.

It will be understood that various modifications can be made to various embodiments of the present invention herein disclosed without departing from the spirit and scope thereof. For example, various sizes of the frame rails as well as the cross-members and other associated parts are contemplated as well as the various types of construction materials. Also, various modifications may be made in the configuration of the parts and their interaction. Therefore, the above description should not be construed as limiting the invention, but merely as an exemplification of preferred embodiments thereof, as the invention is only limited by the following claims.

What is claimed is:

1. A three-wheeled vehicle comprising:
a chassis having a plurality of frame rails extending along a length of the vehicle and a front steering neck, each of said plurality of frame rails being attached, at a forward end thereof, to said front steering neck, each of said frame rails diverging laterally and declining, in a rearward direction, to a first bend, then continuing to diverge laterally, in the rearward direction, to a second bend in the frame rail, then converging laterally, in the rearward direction, to a third bend in the frame rail;
a body supported by said chassis;
a motorcycle front suspension;
an automotive rear suspension;
a front seat;
a rear seat; and
a cooling system having a plurality of radiators disposed under said rear seat, laterally between said pair of frame rails forwardly of said automotive rear suspension;
wherein the plurality of frame rails extend rearwardly and in parallel from the third bend to a rear end of the vehicle.

2. The vehicle as recited in claim 1, wherein said frame rails are each formed of a single piece of rectangular tubing which is angled inwardly along its length, thereby permitting the first two of said three bends to be fabricated in one direction along a flat plane and the third of said three bends to be fabricated as a compound bend in two directions.

3. The vehicle as recited in claim 1, and further comprising:
a fuel tank disposed beneath a frame cross-member and above a rear axle; and
a fuel filler neck disposed beneath a license plate frame on a rear surface of said vehicle.

4. The vehicle as recited in claim 1, and further comprising a pair of steering rods connecting a rear steering bracket assembly to portions of said front suspension, wherein said steering rods are disposed beneath an engine hood in a concealed fashion.

5. The vehicle as recited in claim 4, wherein said hood is hinged between an open upward position and a closed downward position.

6. The vehicle as recited in claim 1, wherein said rear seat has a bottom and a back, and wherein one or both of said rear seat bottom and said rear seat back are hinged and thus pivotable in order to create, modify, or access storage space.

7. The vehicle as recited in claim 6, and further comprising side panels on each side of said rear seat which may be opened to access additional storage space disposed beneath said panels.

8. A three-wheeled vehicle comprising:
a chassis having a plurality of frame rails extending along a length of the vehicle and a plurality of frame cross-members attaching said plurality of frame rails to one another;
a body supported by said chassis;
a motorcycle front suspension;
an automotive rear suspension;
a triple tree which is mounted to said front suspension and comprising front steering mounts; and
a pair of steering rods connecting a rear steering bracket assembly to said front steering mounts on said triple tree, wherein said steering rods and rear steering assembly are disposed beneath an engine hood in a concealed fashion;
wherein said front steering mounts are disposed on a bottom side of the triple tree between a center pivotal bore and outer leg bores disposed on each side.

9. The vehicle as recited in claim 1, wherein said body includes a pair of dual purpose inclined passenger foot restraints disposed in a floorboard of the body beneath a dash panel, said foot restraints functioning to create clearance for receiving exhaust system components and an unobstructed pathway beneath said floorboard for an exhaust pipe to cross over from an inside to an outside of a lower frame rail.

10. The vehicle as recited in claim 1, and further comprising at least one radiator shroud for securing and shielding said plurality of radiators, said plurality of radiators straddling a driveshaft, wherein the at least one radiator shroud provides mounting locations for cooling fans on a bottom rear side of said at least one radiator shroud, thereby permitting the fans to direct air out of the radiators downwardly and in a rearward direction.

11. The vehicle as recited in claim 10, wherein said at least one radiator shroud directs air from intakes located on sides of the body, under said rear seat through said radiators, said at least one radiator shroud conforming to a bottom side of said body, thereby forming a shared air passage directing air entering from either or both sides of the body to flow evenly through said plurality of radiators.

12. The vehicle as recited in claim 1, and further comprising an enclosure attached to a bottom side of said body for creating compartments, which is accessible from under said front or rear seat.

13. The vehicle as recited in claim 1, wherein said first, second, and third bends comprise mandrel bends.

14. The vehicle as recited in claim 4, wherein the rear steering bracket assembly is secured in place by attachment to one of an engine or a or said body, wherein said steering bracket is concealed under a hood, thereby permitting a handlebar riser of the rear steering bracket assembly to extend upwardly through said hood, to hinge upwardly under a handlebar assembly in an unobstructed manner.

15. The vehicle as recited in claim 14, and further comprising a pair of axle brackets, each of said axle brackets including control arm bores wherein said axle brackets are attached on one end to control arm plates containing a plurality of control arm bores, said control arm plates being mounted vertically to a rear inclining side of each frame rail.

16. The vehicle as recited in claim 1, wherein said chassis further comprises a multipurpose rear seat cross-member spanning between said frame rails, said cross-member including multiple mounting points for seat belts and an axle center torque mount.

17. The vehicle as recited in claim 1, wherein said chassis further comprises an axle cross-member spanning between said frame rails, said cross-member providing multiple mounting points for a panhard bar and shock absorbers while providing support to a central trunk floor without the need for additional cross-members or support for said components.

18. The vehicle as recited in claim 1, and further comprising a rear body recess that contains a dual purpose opening for providing a concealed access to a receiver hitch assembly and safety chains mounts.

19. The vehicle as recited in claim 1, and further comprising a shifter assembly disposed in an enclosed compartment behind a dash panel, said shifter assembly including a shifter shaft that extends and vertically pivots through a side of said dash panel, thereby providing a safe operating location of said assembly between a rider's legs, thereby reducing a risk of accidental linkage engagement.

20. The vehicle as recited in claim 1, wherein said chassis further comprises a multipurpose transmission cross member spanning between said frame rails, and including mounts for a body floorboard and front seat belts.

21. The vehicle as recited in claim 1, and further comprising a pair of substantially similar exhaust systems originating at each side, respectively, of said engine, said exhaust systems each turning downwardly and rearwardly in a generally parallel fashion between a pair of said frame rails, turning upwardly and crossing over each respective frame rail at the rear of said engine, wherein the exhaust systems proceed to turn downwardly and to the rear of the vehicle in a horizontally generally parallel fashion with the sides of said body, terminating at the rear wheels.

* * * * *